No. 850,957. PATENTED APR. 23, 1907.
W. F. NEHR.
PRODUCTION OF PHONOGRAPHIC SOUND RECORDS.
APPLICATION FILED JULY 3, 1906.
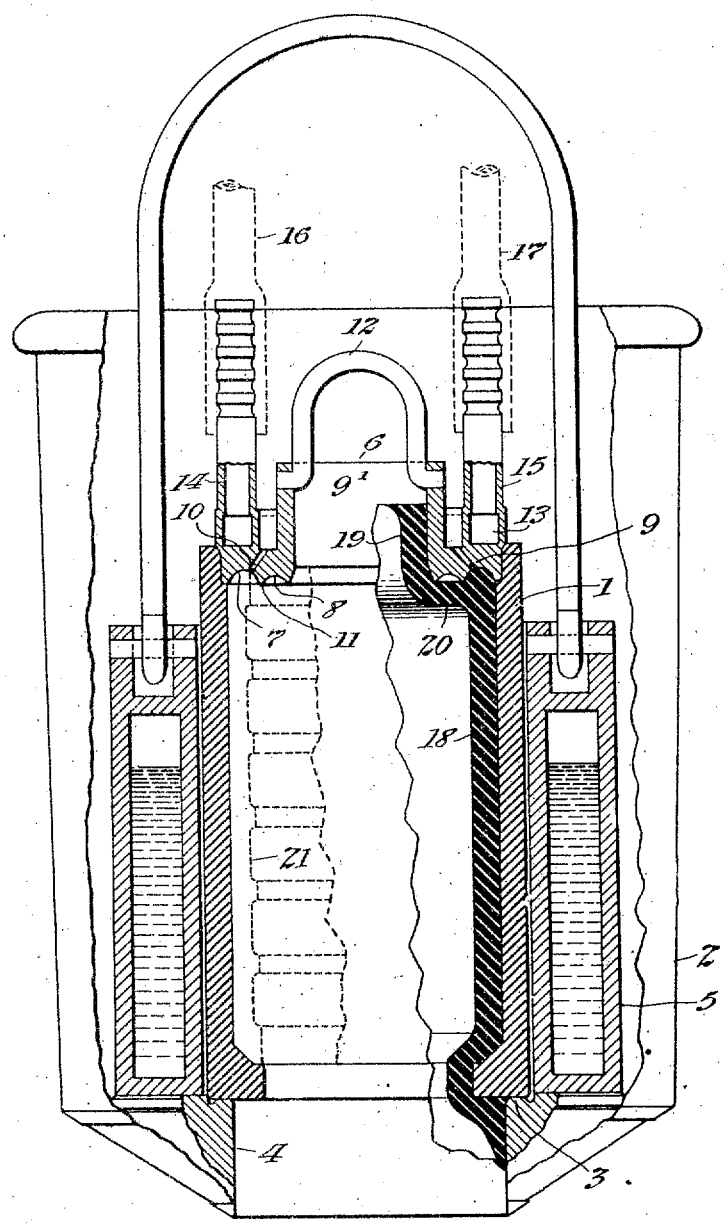

UNITED STATES PATENT OFFICE.

WILLIAM F. NEHR, OF WEST ORANGE, NEW JERSEY, ASSIGNOR TO NEW JERSEY PATENT COMPANY, OF WEST ORANGE, NEW JERSEY, A CORPORATION OF NEW JERSEY.

PRODUCTION OF PHONOGRAPHIC SOUND-RECORDS.

No. 850,957.  Specification of Letters Patent.  Patented April 23, 1907.

Original application filed September 9, 1905, Serial No. 277,800. Divided and this application filed July 3, 1906. Serial No. 324,552.

*To all whom it may concern:*

Be it known that I, WILLIAM FRANK NEHR, a resident of West Orange, in the county of Essex and State of New Jersey, have invented certain new and useful Improvements in the Production of Phonographic Sound-Records, of which the following is a description.

This application is a division of an application filed September 9, 1905, Serial No. 277,800, entitled "Production of phonographic sound-records."

My invention relates to the molding of phonographic sound-records, and more particularly to a molding process described and claimed in United States Letters Patent No. 683,615, dated October 1, 1901, to Miller and Aylsworth, wherein a tubular mold is caused to descend into a bath of molten material, which fills the same and congeals upon its interior in a coating or layer which adheres to the same while the mold is lifted out of the bath, after which the record may be finished upon its interior surface and removed from the mold by radial contraction or shrinkage. Heretofore in producing records according to this process it has not been possible to mold the upper end of the record to the shape desired in the finished article, the practice being to form a rough end, which must afterward be removed in any suitable manner, as by a cutter or trimmer of any suitable description.

My invention has for its object the provision of a process whereby such upper end may be molded into a form suitable for the finished article—that is, a surface which will present a smooth and polished appearance and which will be free from depressions, elevations, discolorations, and all forms of roughness or irregularity. With this end in view I have made a large number of experiments to obtain a mold-cap which when placed upon a tubular coreless mold will be capable of molding the upper end of the sound-record in the manner referred to for an indefinite number of operations. From these experiments I have determined that the mold-cap should have a concave surface, the outer edge of which during molding operation adjoins and forms a continuation of the bore of the mold. Preferably the body of the mold should extend above at least the lower part of said concave surface, so that when the cap is removed from the mold the molded end of the record, or that portion which forms the end after the reaming operation, will be protected by the mold against accidental injury during the handling of the same prior to the removal of the finished article from the mold. I have also determined that the said concave surface may be of such form as to entrap a portion of the air contained in the bore of the mold as the same descends into the molten material, in which case the air is permitted to escape through air-holes extending through the body of the mold-cap. I have also obtained good results by providing a second groove concentric with the first groove and separated therefrom by a partition which tapers to a comparatively sharp edge. I have also discovered that the concave surface should be perfectly smooth and highly polished and preferably nickel-plated and also that the mold-cap should be kept cool during the molding operation, as by providing the same with a water-jacket.

My invention consists in the features hereinafter described and claimed.

Reference is hereby made to the accompanying drawing, which is a vertical section showing a mold supported in a mold-carrier and surrounded by a water-jacket in the usual manner and provided with a cap constructed in accordance with my invention.

In carrying out the process of Patent No. 683,615, above referred to, the usual practice is to provide a tubular mold 1, carrying upon its interior surface a negative copy of the sound-record which it is desired to duplicate. This mold is open at the bottom to permit the molten material used for forming the duplicate to enter the mold, the mold being supported by a suitable carrier or support 2, which is provided with a seat 3 for the lower end of the mold and an opening 4 to allow the molten material to enter the mold. A removable water-jacket 5 surrounds the mold in order to keep the same at a temperature considerably below that of the molten mixture. The parts thus described, speaking broadly, are well known in this art and form no part of my invention. The particular form of mold illustrated is believed to be novel, however, and is described and claimed in an application of Edward L. Aiken, filed October 12, 1905, Serial No. 282,365.

The mold-cap 6 consists of a circular body of a size suitable to fit within the upper end of the mold 1 and close the same. The lower surface of this cap is provided with two circular grooves 7 and 8. A central opening 9' extends through the body of the cap. The outer surface of the groove 7 is so situated as to form a continuation of the interior surface of the mold 1. At the deepest portion of the groove 7 is a small V-shaped groove 9, and communicating with the said groove 9 are a large number of air-holes 10, which extend through the body of the cap 6. The grooves 7 and 8 are separated by a web or partition 11, whose lower edge is comparatively sharp and occupies substantially the same horizontal plane as the outer edge of the groove 7 and inner edge of the groove 8. The cap 6 may be constructed of any suitable metal or alloy, such as brass, and its entire lower surface is highly polished and nickel-plated, so as to present at all times a bright untarnished surface.

The cap 6 is provided with a curved rod 12, by which it may be conveniently handled. The cap 6 is also provided with a water-jacket 13, preferably integral therewith, and is supplied with water through a flexible tube 16 and an inlet-pipe 14, the water leaving the jacket through an exit-pipe 15 and flexible tube 17.

In molding a record with the apparatus shown the temperature of the wax and the duration of immersion of the mold will be such that the mold will receive upon its interior surface a coating of congealed wax 18. Upon removing the mold from the bath of molten material the said coating adheres to the mold, and as soon as the wax has cooled sufficiently the cap 6 may be removed by a longitudinal movement and the neck 19 of the molded article may be removed by giving it a slight twist, whereupon it breaks off generally at or near the point 20. The interior of the record is then reamed out by a properly-shaped knife while the wax is still soft, so that its interior surface assumes the shape indicated by dotted lines 21. It will be noted that the line 21 falls just outside of the groove 9 and air-holes 10, so that any impression which may have been produced by these parts will not appear upon the finished article. Furthermore, that portion of the congealed wax from which the record is formed is entirely within the body of the mold, so as to be protected thereby at all stages of manufacture.

After the reaming operation the record may be removed from the mold in an entirely finished condition by cooling, thereby producing a relative contraction of the record with respect to the mold and then withdrawing the record from the mold by a longitudinal movement.

Having now described my invention, what I claim as new therein, and desire to secure by Letters Patent, is as follows:

1. The process of molding which consists in causing the molten material to rise and congeal in a layer upon the interior of a hollow coreless mold, entrapping the air nearest the wall of the mold and allowing it to escape through an air-passage, removing the mold with its congealed layer from the molten material and then reaming out the bore of said layer while soft, on a line falling without the position of the air-passage, substantially as set forth.

2. The process of molding which consists in causing the molten material to rise and congeal upon the interior of a tubular coreless mold, having an overhanging concave surface forming a continuation of the bore of the mold, removing the mold with its congealed layer from the molten material and then reaming out the bore of the layer while soft on a line which intersects the position of said concave surface at a point situated within the body of the mold, substantially as set forth.

This specification signed and witnessed this 27th day of June, 1906.

WILLIAM F. NEHR.

Witnesses:
DELOS HOLDEN,
FRANK L. DYER.